July 29, 1952   J. L. BOYER   2,605,312

FLUID-COOLED AND INSULATED WINDINGS

Filed Sept. 2, 1950

WITNESSES:
E. A. McCloskey.
Leon J. Taga

INVENTOR
John L. Boyer.
BY O. B. Buchanan
ATTORNEY

Patented July 29, 1952

2,605,312

UNITED STATES PATENT OFFICE 2,605,312

FLUID-COOLED AND INSULATED WINDINGS

John L. Boyer, Pittsburgh, Pa., assignor to Westinghouse Electric Corporation, East Pittsburgh, Pa., a corporation of Pennsylvania Application September 2, 1950, Serial No. 182,993

18 Claims. (Cl. 171—252)

My invention relates to moderately high-voltage generators, or other induction machines, in which a coil or winding is placed in spaced relation to the core. For example, in a dynamo-electric machine, the coil-sides of the high-voltage winding are spaced from both sides of the slots which receive said coil-sides, so as to provide a cooling and insulating duct on each side of each coil-side. It is a characteristic feature of my invention that the cooling fluid itself is used as the principal insulating-barrier between the current-carrying conductor and the core. In this way, I avoid the extra space which is required when a solid insulating layer is used as the principal voltage-withstanding barrier between the conductor and the core. In this way, I also provide for a substantially direct heat-transfer from the conductor to the core, through the medium of the fluid within said duct, or both from the conductor and from the core into the cooling and insulating fluid, this fluid being then circulated through a heat-exchanger.

I have found that the conditions at the junction between a conductor and an insulator have a great effect upon the breakdown-voltage of the insulator and the gas or other fluid which surrounds the insulator. The breakdown-voltage of a good insulator-design, as compared with that of a bad design of the same total dimensions, can be four or more times higher. My invention provides various features making a good insulator-design, as will be subsequently described.

My invention is particularly designed for equipments in which the cooling and insulating fluid is a gas at a pressure which is considerably higher than atmospheric, although it is possible to use insulating oil, or other insulating liquid, for the cooling and insulating fluid.

My invention was particularly designed, or primarily intended, for a gas-cooled dynamo-electric machine, such as a turbine-generator of moderately high-voltage rating. I wish it to be understood, however, that my invention is applicable also to other electrical machines having windings which are associated in inductive relation to a magnetizable core.

Figure 1:
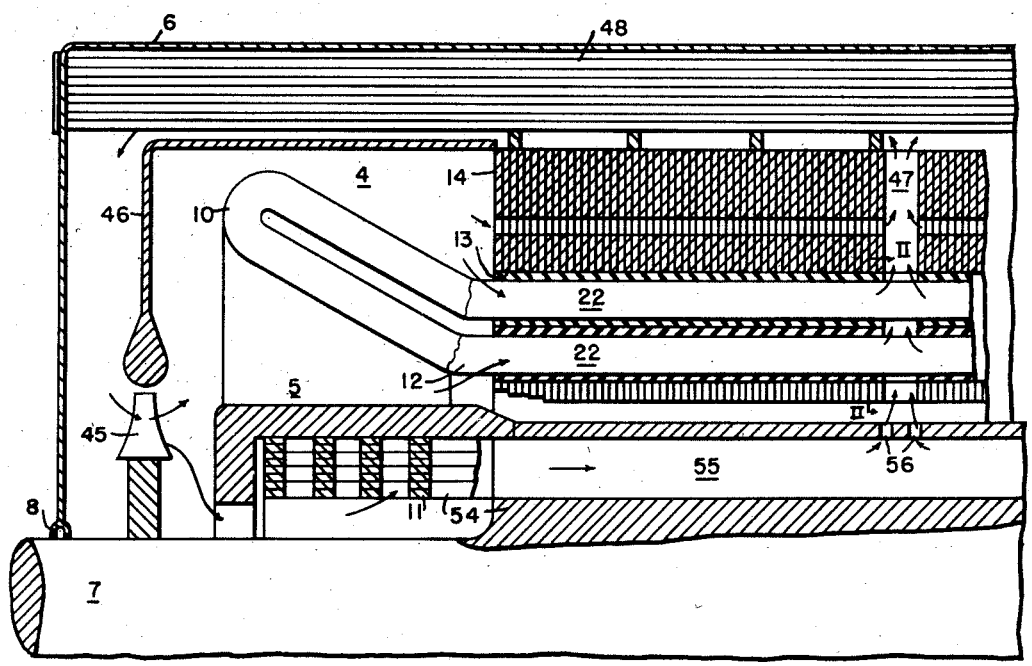
Figure 2:
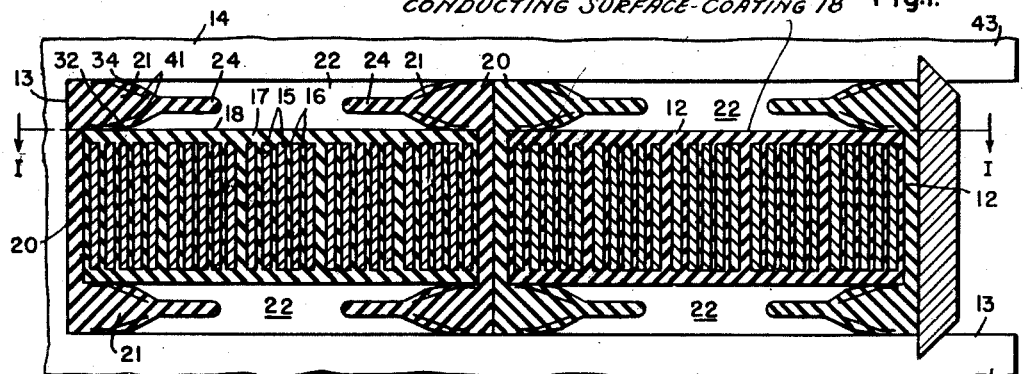
Figure 3:
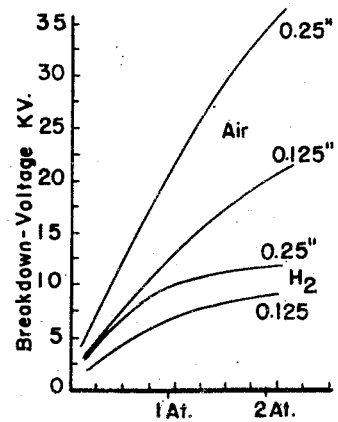

With the foregoing and other objects in view, my invention consists in the machines, combinations, systems, parts, and methods of design and operation, hereinafter described and claimed, and illustrated in the accompanying drawing, wherein Figure 1 is a longitudinal sectional view through the upper left-hand quarter of a turbine-generator, showing an exemplary form of embodiment of my present invention, the section-plane being approximately as indicated by the line I—I in Fig. 2, Fig. 2 is an enlarged sectional view, turned sideways, through one of the winding-receiving slots of the stator, as indicated by the section-plane II—II in Fig. 1, and Fig. 3 is a curve-diagram which will be referred to in the explanation of my invention.

In Fig. 1, I have shown a large polyphase turbine-generator, comprising a stator part 4 and a rotor part 5, enclosed in a gas-tight outer frame-housing 6. The rotor is shown as being mounted on a shaft 7 which extends out through the housing 6 in a gas-tight journal-bearing joint which may be regarded as being symbolically indicated at 8. The housing 6 is filled with a suitable cooling insulating fluid, which is preferably gas, in order to reduce the windage-losses. If the cooling and insulating fluid is a gas, its gaseous pressure must be raised and maintained at a value which is considerably higher than atmospheric pressure, in order to provide the necessary breakdown - voltage strength, as will be subsequently described. In cases where windage losses are not a problem, as where my invention is applied to a non-rotating induction machine such as a transformer, or in turbo-generators in which the stator member is enclosed in a separate enclosure, separate from the rotor-member, I may use an insulating oil for the cooling and insulating fluid.

Turbine-generators, such as I have shown in Fig. 1, commonly have a high-voltage polyphase winding 10 on the stator part 4, while the rotor part 5 carries a field or exciting winding 11, which is always a winding having a relatively low voltage. In some machines, however, the high-voltage winding is on the rotating part, and the low-voltage winding on the stationary part. My invention has particular relation to the high-voltage winding-part of the machine, and while I shall particularly describe it with reference to a machine in which said winding is on the stator part, I wish it to be understood that my invention is not altogether limited to such an arrangement.

As shown in Figs. 1 and 2, the high-voltage stator-winding 10 has a plurality of multi-conductor coil-sides 12 which are disposed in spaced relation within the winding-receiving slots 13 of the magnetizable stator-core 14.

Each of the coil-sides 12 is made up of a plurality of individual conductors 15, which may either be parallel-connected strands of lightly insulated conductors for the purpose of reducing eddy-currents, or the conductors which make up a coil-side 12 may be the successive turns of a plurality of turns which are bound together to make up a multi-turn coil. The individual copper straps or conductors 15 of each coil-side 12 are each lightly wrapped with a standard low-voltage insulation 16 around each individual conductor, and the entire coil-side 12 is again wrapped around with a standard low-voltage insulation 17, so that each coil-side can be handled as a unit. This outer insulating wrapping 17 is preferably provided with a conducting surface-coating 18 which may be metal foil or a conducting varnish. It is important, in my invention, to keep most of the voltage between the conducting coat 18 and the iron of the stator-core 14 which surrounds the conductor-receiving slot 13.

The respective coil-sides 12 are held in spaced relation within the slots 13, by means of special channel-shaped members 20 of solid insulating material, overlying respectively the tops and bottoms of the coil-sides 12 in the respective slots 13. These channel-shaped insulating-members 20 have thick side-pieces 21, each of which fits snugly between one of the broad flat outer surfaces of a coil-side 12 and the broad flat core-surface which bounds the corresponding side of the winding-receiving slot 13. These side-pieces 21 thus serve as insulating barriers for spacing the coil-sides 12 from the slots 13. The channel-members 20 are placed only at the tops and bottoms of the coil-sides 12, leaving most of the sides of said coil-sides 12 uncovered, so as to provide ducts 22, each duct being bounded, on one broad flat side, by the conducting surface-coating 18 of a coil-side 12, and on the other broad flat side by the bare surface of the iron which borders the slot 13. The top and bottom edges of each duct 22 are provided by the insulating side-pieces or barriers 21.

In accordance with my invention, it is necessary to provide some means for providing a good insulator-design for the insulating barriers or side-pieces 21 which space the coil-sides 12 from the slots 13. The basic requirements for a good design of insulator are the following:

(1) The junction between the conductor and the insulator should be placed so that said junction is located in a minimum electrostatic field.

(2) This junction should be placed so that the point of contact is in a concave crack, where there are deionization-surfaces.

(3) The potential-gradient along the creepage-surface should be low at this junction.

Fig. 2 (turned sideways) shows the basic design of an improved generator-slot 13, using gas insulation. I have illustrated a design in which two coil-sides 12 lie one over the other, within each slot 13, which is the usual construction. When this is the case, each coil-side must be treated as a separate coil-side, and the two coil-sides in any given slot must be insulated from each other, as by means of the insulating channels 20 which have already been described.

The insulating barriers 21 have intermediate extending portions 24, which extend into the respective ducts 22, in spaced relation to both the coil-side 12 and the core 14. These extending portions provide an increased creepage-length on the insulating barrier, so as to increase the length of surface which is interposed between the surface-coating 18 of the coil-side 12 and the stator-core 14. These intermediate extending portions 24 also provide the concave cracks at the junctions 32 and 34 between the insulating barriers 21 and the coil-side 12 and core 14, respectively. The re-entrant surface-portions adjacent to these concave cracks at the junctions 32 and 34 thus provide deionizing surfaces for deionizing the gas in the immediate vicinity of said junctions. Said reentrant surfaces also tend to reduce the creepage potential-gradient along the surface of the insulating barrier 21, and this effect is enchanced also by the extra length of creepage-surface which is provided by the extending portions 24 of the barrier.

I also prefer, in most cases, to use a means for providing a minimum electrostatic field in the vicinity of the aforesaid junctions 32 and 34. A suitable means to this end may consist of imbedded metal foils or other shielding-means 41, which are imbedded within the insulating material of said barriers 21 near each of said junctions 32 and 34. Preferably, each of the shields 41 has a portion which makes contact with the conducting surface against which the barrier lies, at a point spaced back from the junction 32 or 34, as the case may be. Each shield 41 extends out over its junction 32 or 34, as the case may be, thus electrostatically shielding said junction.

Fig. 3 shows the breakdown-voltage curves for a quarter-inch gap and an eighth-inch gap, both in air and in hydrogen, for various pressures, as marked on the diagram. A generator for 13.8 kilovolts, line-to-line, should have about a 0.25 inch total gap at all places where there is a high voltage-gradient in air, and the air should preferably be at a pressure of two or more atmospheres. For lower voltages, this gap-spacing can be reduced. A practical voltage-rating for the most advantageous application of my invention is 6.9 kilovolts. It will be understood, however, that my invention is not limited to these particular voltages which have been mentioned.

It will be noted, from Fig. 3, that, whatever gas is used as the cooling and insulating fluid for circulation through the ducts 22, it is practically necessary, in the interests of reducing the gap-spacings of the ducts, to use a gaseous pressure which is considerably higher than atmospheric pressure. A reasonably small duct-width, in a circumferential direction, is particularly necessary, in order to provide an adequate flux-carrying cross-section of the teeth 43 between the successive slots 13.

From the standpoint of low windage-losses, hydrogen is the preferred coolant, and when hydrogen is the gas which is used, it will be noted from Fig. 3 that the breakdown-voltage curves begin to flatten off after about two atmospheres of pressure, so that a further increase in the gaseous pressure, above two atmospheres, is of very little benefit.

When air is used as the gaseous medium for providing cooling and insulation, it will be noted that the same gap-spacing will withstand a considerably higher voltage-difference, before breakdown, than in the case of hydrogen at a corresponding pressure; and it will also be noted that breakdown-voltage curves for air do not flatten off so promptly, indicating that pressures considerably higher than two atmospheres will be advantageous from the standpoint of increasing the breakdown-voltage of a given gap-length of circumferential width of the duct 22. It is believed that gases other than hydrogen will in general partake of the nature of air, rather than hydrogen, so far as breakdown voltage-strength is concerned.

A machine designed in accordance with my invention, and operating with a gas under a considerable pressure, higher than the atmospheric pressure, and relying upon that pressure for maintaining its necessary insulation-strength, will obviously be subject to the handicap that the machine will have to be quickly taken out of service if there should be a loss of gaseous pressure, for any reason whatever. Under normal circumstances, a simple pressure-responsive means (not shown) would be installed for instantaneously removing the machine from service and killing its field, upon a loss of gaseous pressure.

Any suitable means may be provided for circulating the gas (or other fluid) in the ducts 22. As shown in Fig. 1, recirculation of the gas is maintained by means of a fan 45, which is carried by the shaft 7 at each end of the rotor-member 5. A suitable end-baffle 46 is provided at each end of the machine, for leading the recirculated gas into the fan 45, whence the gas is supplied to that end of the stator-windings 10. This gas then enters the ducts 22 and travels longitudinally therethrough to the center of the machine, at which point a radial ventilating-duct 47 is provided, which causes the gas to flow radially outwardly to a cooler 48, after which the gas is returned to the entrance-side of the fan 45, as indicated by the arrows.

A similar cooling-system can be used for the rotor-winding 11, except that, in this case, the voltage of the winding is quite low, and the special insulating channels 20 or barrier-shapes 21 are not needed. The rotor-core 54, in Fig. 1, is provided with conductor-receiving slots 55 which provide simple channels or ducts through which the cooling gas can flow, to cool the rotor-winding 11, this gas being expelled from the center of the rotor, by means of radial openings or vents 56.

While I have shown my invention in a single illustrative form of invention, and have given exemplary design-data therefor, I wish it to be understood that my invention is not at all limited to the illustrated or stated details, as variant forms and proportions may be substituted for the forms and proportions which I have shown or described. Various parts may also be added or omitted, within the scope of my invention. I desire, therefore, that the appended claims shall be accorded the broadest construction consistent with the prior art.

I claim as my invention:

1. An induction machine having a magnetizable core, a multi-conductor coil disposed in spaced relation to said core, said spaced relation providing a duct for a cooling and insulating fluid which is in substantially direct heat-transfer relation both to said coil and to said core, and which provides the principal insulating-barrier therebetween, enclosure-means for holding said fluid, circulation-means for causing said fluid to flow through said duct, and solid insulating barriers between said coil and said core along each side of said duct, so that said duct is bounded by a relatively broad flat outer coil-surface, one of said barriers, a relatively broad core-surface, and the other barrier; characterized by said barriers having intermediate extending portions, extending into said duct in spaced relation to both said coil-surface and said core-surface, and having such configuration as to provide concave cracks at their junctions with a conducting surface against which said barriers lie.

2. The invention as defined in claim 1, characterized by said fluid being a gas at a pressure considerably higher than atmospheric.

3. An induction machine having a magnetizable core, a multi-conductor coil disposed in spaced relation to said core, said spaced relation providing a duct for a cooling and insulating fluid which is in substantially direct heat-transfer relation both to said coil and to said core, and which provides the principal insulating-barrier therebetween, enclosure-means for holding said fluid, circulation-means for causing said fluid to flow through said duct, and solid insulating barriers between said coil and said core along each side of said duct, so that said duct is bounded by a relatively broad flat outer coil-surface, one of said barriers, a relatively broad core-surface, and the other barrier; characterized by said barriers having intermediate extending portions, extending into said duct in spaced relation to both said coil-surface and said core-surface.

4. The invention as defined in claim 3, characterized by said fluid being a gas at a pressure considerably higher than atmospheric.

5. An induction machine having a magnetizable core, a multi-conductor coil disposed in spaced relation to said core, said spaced relation providing a duct for a cooling and insulating fluid which is in substantially direct heat-transfer relation both to said coil and to said core, and which provides the principal insulating-barrier therebetween, enclosure-means for holding said fluid, circulation-means for causing said fluid to flow through said duct, and solid insulating barriers between said coil and said core along each side of said duct, so that said duct is bounded by a relatively broad flat outer coil-surface, one of said barriers, a relatively broad core-surface, and the other barrier; characterized by said barriers having intermediate extending portions, extending into said duct in spaced relation to both said coil-surface and said core-surface, and shielding-means imbedded in said barrier near their junctions with a conducting surface against which said barriers lie, for reducing the electrostatic fields at said junctions.

6. The invention as defined in claim 5, characterized by said fluid being a gas at a pressure considerably higher than atmospheric.

7. An induction machine having a magnetizable core, a multi-conductor coil disposed in spaced relation to said core, said spaced relation providing a duct for a cooling and insulating fluid which is in substantially direct heat-transfer relation both to said coil and to said core, and which provides the principal insulating-barrier therebetween, enclosure-means for holding said fluid, circulation-means for causing said fluid to flow through said duct, and solid insulating barriers between said coil and said core along each side of said duct, so that said duct is bounded by a relatively broad flat outer coil-surface, one of said barriers, a relatively broad core-surface, and the other barrier, characterized by the conductors of said coil having relatively light conductor-to-conductor insulation, the entire multi-conductor coil having a conducting surface-coating, at least on the side which borders on said duct, and said barriers having intermediate extending portions, extending into said duct in spaced relation to both said coil-surface and said core-surface, and having such configuration as to provide concave cracks at their junctions with the conducting surfaces against which said barriers lie.

8. An induction machine having a magnetizable core, a multi-conductor coil disposed in spaced relation to said core, said spaced relation providing a duct for a cooling and insulating fluid which is in substantially direct heat-transfer relation both to said coil and to said core, and which provides the principal insulating-barrier therebetween, enclosure-means for holding said fluid, circulation-means for causing said fluid to flow through said duct, and solid insulating barriers between said coil and said core along each side of said duct, so that said duct is bounded by a relatively broad flat outer coil-surface, one of said barriers, a relatively broad core-surface, and the other barrier; characterized by the conductors of said coil having relatively light conductor-to-conductor insulation, the entire multi-conductor coil having a conducting surface-coating, at least on the side which borders on said duct, and said barriers having intermediate extending portions, extending into said duct in spaced relation to both said coil-surface and said core-surface.

9. An induction machine having a magnetizable core, a multi-conductor coil disposed in spaced relation to said core, said spaced relation providing a duct for a cooling and insulating fluid which is in substantially direct heat-transfer relation both to said coil and to said core, and which provides the principal insulating-barrier therebetween, enclosure-means for holding said fluid, circulation-means for causing said fluid to flow through said duct, and solid insulating barriers between said coil and said core along each side of said duct, so that said duct is bounded by a relatively broad flat outer coil-surface, one of said barriers, a relatively broad core-surface, and the other barrier; characterized by the conductors of said coil having relatively light conductor-to-conductor insulation, the entire multi-conductor coil having a conducting surface-coating, at least on the side which borders on said duct, said barriers having intermediate extending portions, extending into said duct in spaced relation to both said coil-surface and said core-surface and shielding-means imbedded in said barriers near their junctions with the conducting surfaces against which said barriers lie, for reducing the electrostatic fields at said junctions.

10. A dynamo-electric machine having a stator part and a rotor part, one of said parts comprising a magnetizable core having winding-receiving slots, and a high-voltage winding having a plurality of multi-conductor coil sides disposed in spaced relation within said slots, said spaced relation providing ducts for a cooling and insulating fluid which is in substantially direct heat-transfer relation both to said coil-sides and to the core-material surrounding said ducts, and which provides the principal insulating-barrier therebetween, enclosure-means for holding said fluid, circulation-means for causing said fluid to flow through said ducts, and channel-shaped members of solid insulating material, overlying the tops and bottoms of the coil-sides in the respective slots, the side pieces of said channel-shaped members constituting solid insulating barriers between said coil-sides and said core along the respective sides of the respective ducts, so that each duct is bounded by a relatively broad flat outer surface of a coil-side, one of said barriers, a relatively broad core-surface, and the other barrier; characterized by said barriers having intermediate extending portions, extending into said duct in spaced relation to both said coil-surface and said core-surface, and having such configuration as to provide concave cracks at their junctions with a conducting surface against which said barriers lie.

11. The invention as defined in claim 10, characterized by said fluid being a gas at a pressure considerably higher than atmospheric.

12. A dynamo-electric machine having a stator part and a rotor part, one of said parts comprising a magnetizable core having winding-receiving slots, and a high-voltage winding having a plurality of multi-conductor coil-sides disposed in spaced relation within said slots, said spaced relation providing ducts for a cooling and insulating fluid which is in substantially direct heat-transfer relation both to said coil-sides and to the core-material surrounding said ducts, and which provides the principal insulating-barrier therebetween, enclosure-means for holding said fluid, circulation-means for causing said fluid to flow through said ducts, and channel-shaped members of solid insulating material, overlying the tops and bottoms of the coil-sides in the respective slots, the side pieces of said channel-shaped members constituting solid insulating barriers between said coil-sides and said core along the respective sides of the respective ducts, so that each duct is bounded by a relatively broad flat outer surface of a coil-side, one of said barriers, a relatively broad core-surface, and the other barrier; characterized by said barriers having intermediate extending portions, extending into said ducts in spaced relation to both said coil-surface and to said core-surface.

13. The invention as defined in claim 12, characterized by said fluid being a gas at a pressure considerably higher than atmospheric.

14. A dynamo-electric machine having a stator part and a rotor-part, one of said parts comprising a magnetizable core having winding-receiving slots, and a high-voltage winding having a plurality of multi-conductor coil-sides disposed in spaced relation within said slots, said spaced relation providing ducts for a cooling and insulating fluid which is in substantially direct heat-transfer relation both to said coil-sides and to the core-material surrounding said ducts, and which provides the principal insulating-barrier therebetween, enclosure-means for holding said fluid, circulation-means for causing said fluid to flow through said ducts, and channel-shaped members of solid insulating material, overlying the tops and bottoms of the coil-sides in the respective slots, the side pieces of said channel-shaped members constituting solid insulating barriers between said coil-sides and said core along the respective sides of the respective ducts, so that each duct is bounded by a relatively broad flat outer surface of a coil-side, one of said barriers, a relatively broad core-surface, and the other barrier; characterized by said barriers having intermediate extending portions, extending into said ducts in spaced relation to both said coil-surface and said core-surface, and shielding-means imbedded in said barriers near their junctions with a conducting surface against which said barriers lie, for reducing the electrostatic fields at said junctions.

15. The invention as defined in claim 14, characterized by said fluid being a gas at a pressure considerably higher than atmospheric.

16. A dynamo-electric machine having a stator part and a rotor part, one of said parts comprising a magnetizable core having winding-receiving slots, and a high-voltage winding having a plurality of multi-conductor coil-sides disposed in spaced relation within said slots, said spaced relation providing ducts for a cooling and insulating fluid which is in substantially direct heat-transfer relation both to said coil-sides and to the core-material surrounding said ducts, and which provides the principal insulating-barrier therebetween, enclosure-means for holding said fluid, circulation-means for causing said fluid to flow through said ducts, and channel-shaped members of solid insulating material, overlying the tops and bottoms of the coil-sides in the respective slots, the side pieces of said channel-shaped members constituting solid insulating barriers between said coil-sides and said core along the respective sides of the respective ducts, so that each duct is bounded by a relatively broad flat outer surface of a coil-side, one of said barriers, a relatively broad core-surface, and the other barrier; characterized by the conductors of said coil-sides having relatively light conductor-to-conductor insulation, each of the entire multi-conductor coil-sides having a conducting surface-coating, at least on the sides which border on the respective ducts, and said barriers having intermediate extending portions, extending into said duct in spaced relation to both said coil-surface and said core-surface, and having such configuration as to provide concave cracks at their junctions with the conducting surfaces against which said barriers lie.

17. A dynamo-electric machine having a stator part and a rotor part, one of said parts comprising a magnetizable core having winding-receiving slots, and a high-voltage winding having a plurality of multi-conductor coil-sides disposed in spaced relation within said slots, said spaced relation providing ducts for a cooling and insulating fluid which is in substantially direct heat-transfer relation both to said coil-sides and to the core-material surrounding said ducts, and which provides the principal insulating-barrier therebetween, enclosure-means for holding said fluid, circulation-means for causing said fluid to flow through said ducts, and channel-shaped members of solid insulating material, overlying the tops and bottoms of the coil-sides in the respective slots, the side pieces of said channel-shaped members constituting solid insulating barriers between said coil-sides and said core along the respective sides of the respective ducts, so that each duct is bounded by a relatively broad flat outer surface of a coil-side, one of said barriers, a relatively broad core-surface, and the other barrier; characterized by the conductors of said coil-sides having relatively light conductor-to-conductor insulation, each of the entire multi-conductor coil-sides having a conducting surface-coating, at least on the sides which border on the respective ducts, and said barriers having intermediate extending portions, extending into said ducts in spaced relation to both said coil-surface and said core-surface.

18. A dynamo-electric machine having a stator part and a rotor part, one of said parts comprising a magnetizable core having winding-receiving slots, and a high-voltage winding having a plurality of multi-conductor coil-sides disposed in spaced relation within said slots, said spaced relation providing ducts for a cooling and insulating fluid which is in substantially direct heat-transfer relation both to said coil-sides and to the core-material surrounding said ducts, and which provides the principal insulating-barrier therebetween, enclosure-means for holding said fluid, circulation-means for causing said fluid to flow through said ducts, and channel-shaped members of solid insulating material, overlying the tops and bottoms of the coil-sides in the respective slots, the side pieces of said channel-shaped members constituting solid insulating barriers between said coil-sides and said core along the respective sides of the respective ducts, so that each duct is bounded by a relatively broad flat outer surface of a coil-side, one of said barriers, a relatively broad core-surface, and the other barrier; characterized by the conductors of said coil-sides having relatively light conductor-to-conductor insulation, each of the entire multi-conductor coil-sides having a conducting surface-coating, at least on the sides which border on the respective ducts, said barriers having intermediate extending portions, extending into said ducts in spaced relation to both said coil-surface and said core-surface, and shielding-means imbedded in said barriers near their junctions with the conducting surfaces against which said barriers lie, for reducing the electrostatic fields at said junctions.

JOHN L. BOYER.

REFERENCES CITED

The following references are of record in the file of this patent:

UNITED STATES PATENTS

| Number | Name | Date |
| --- | --- | --- |
| 1,784,997 | Schenkel | Dec. 16, 1930 |
| 2,285,960 | Fechheimer | June 9, 1942 |
| 2,417,783 | Pollard | Mar. 18, 1947 |

FOREIGN PATENTS

| Number | Country | Date |
| --- | --- | --- |
| 314,808 | Great Britain | Nov. 3, 1930 |
| 369,181 | Great Britain | Sept. 5, 1930 |
| 289,215 | Germany | Dec. 9, 1915 |
| 615,240 | France | Oct. 4, 1926 |